(12) United States Patent
Katta et al.

(10) Patent No.: US 9,201,107 B2
(45) Date of Patent: Dec. 1, 2015

(54) CELL CHARACTERIZATION WITH MILLER CAPACITANCE

(71) Applicant: TAIWAN SEMICONDUCTOR MANUFACTURING COMPANY LTD., Hsinchu (TW)

(72) Inventors: Nitesh Katta, Hsinchu (TW); Jerry Chang-Jui Kao, Taipei (TW); King-Ho Tam, Hsinchu County (TW); Kuo-Nan Yang, Hsinchu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 222 days.

(21) Appl. No.: 14/059,332

(22) Filed: Oct. 21, 2013

(65) Prior Publication Data
US 2015/0035551 A1    Feb. 5, 2015

Related U.S. Application Data

(60) Provisional application No. 61/860,671, filed on Jul. 31, 2013.

(51) Int. Cl.
G01R 27/26     (2006.01)
G06F 17/50     (2006.01)

(52) U.S. Cl.
CPC ........ *G01R 27/2605* (2013.01); *G01R 27/2694* (2013.01); *G06F 17/5063* (2013.01); *G06F 2217/78* (2013.01)

(58) Field of Classification Search
CPC ............... G01R 27/2605; G01R 27/18; G01R 27/2694; G01R 31/025; G01R 31/028; G01R 31/11; G01R 31/42
See application file for complete search history.

(56) References Cited

U.S. PATENT DOCUMENTS

2007/0075710 A1*  4/2007  Hargreaves et al. .......... 324/658
2008/0061800 A1*  3/2008  Reynolds et al. ............. 324/678

* cited by examiner

Primary Examiner — Tung X Nguyen
(74) Attorney, Agent, or Firm — WPAT, P.C.; Anthony King

(57) ABSTRACT

A method for cell characterization with Miller capacitance includes characterizing input capacitance of an input of a first stage in a cell by considering a first current transition at the input of the first stage up to a first stop time. The first stop time occurs during the first current transition exhibits a substantial tail portion contributed by the later of a first input voltage transition and a first output voltage transition reaching a corresponding steady state voltage. The first input voltage transition is associated with the input of the first stage. The first output voltage transition is associated with an output of the first stage coupled to the input through a capacitor.

20 Claims, 10 Drawing Sheets

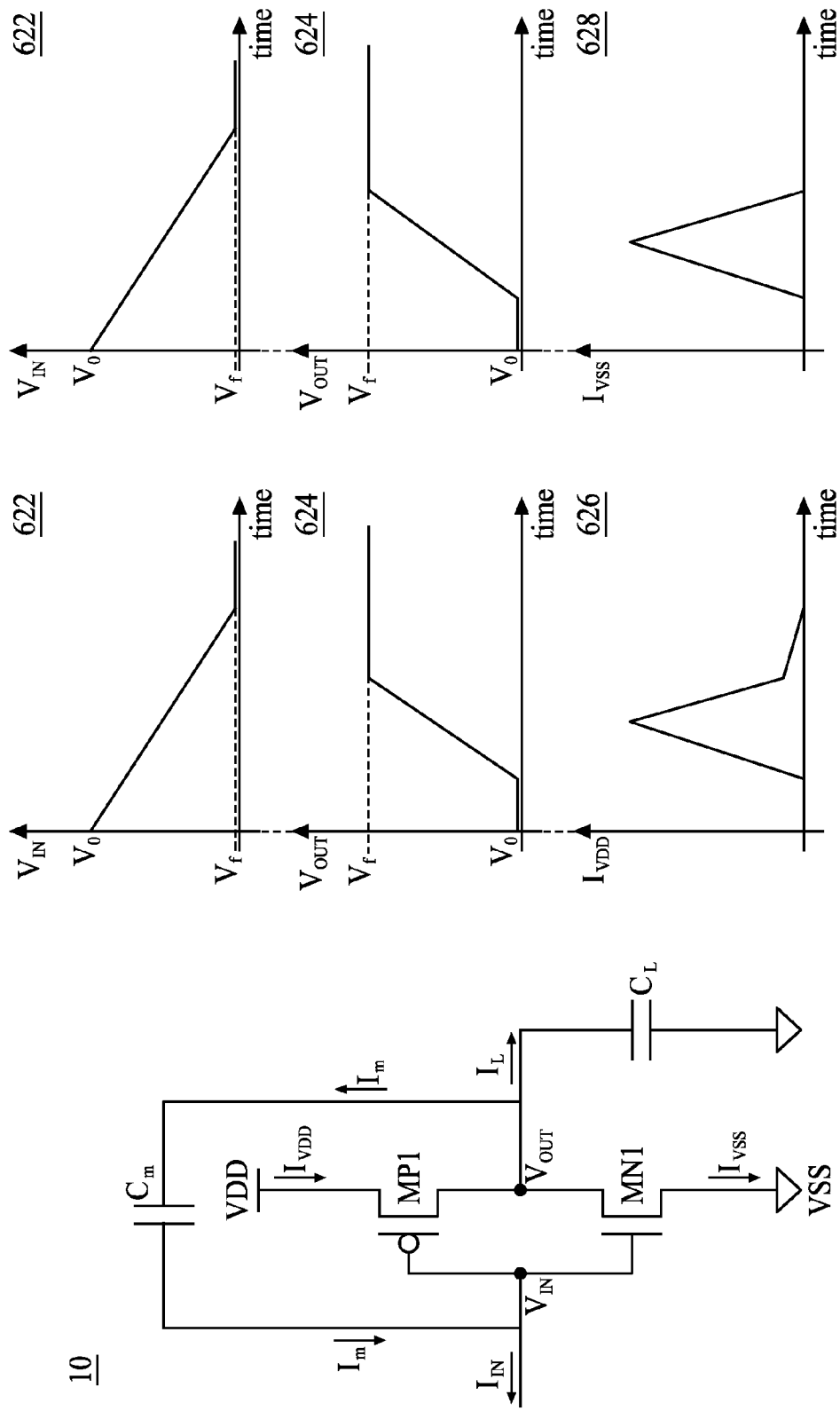

CELL CHARACTERIZATION WITH MILLER CAPACITANCE

TECHNICAL FIELD

The present disclosure is related to cell characterization with Miller capacitance.

BACKGROUND

For cell-based power calculation, calculating total power of a system comprising a plurality of cells includes characterizing each cell for power calculation, and using the characteristics of each cell in the system to calculate the total power of the system.

A single-stage digital cell is described as an example below. The power of the cell includes leakage power and dynamic power. The leakage power is characterized when the cell is in steady state. The dynamic power is characterized when the cell is switching, an event in which an input transition to the cell initiated an output transition. The dynamic power includes switching power and internal power. The switching power is caused by charging and subsequent discharging of a loading capacitor at the output of the cell. The loading capacitor is partly contributed by input capacitance of each other cell coupled to the output of the cell. The internal power is power supplied by a supply rail VDD during switching of the cell other than switching power and leakage power. For example, for a complementary metal oxide semiconductor (CMOS) cell, the internal power includes power consumption caused by a short circuit current from a supply rail VDD to ground VSS during switching. Therefore, in some approaches, cell characterization for power calculation includes determining input capacitance of the cell and internal energy consumed by the cell with respect to an input transition at an input of the cell and a loading to the output of the cell.

In some approaches, for characterizing input capacitance and internal energy, integration is performed on an input current transition resulted from an input voltage transition at the input and the supply rail VDD or ground VSS of the cell. The input current transition is integrated from a start time to a stop time identified using the input voltage transition. However, this approach ignores an effect of a capacitor coupling an output of the cell to the input of the cell. The effective capacitance of this capacitor seen at the input of the cell is further increased because the output to the input of the cell exhibits gain. The effective capacitance is called the Miller capacitance. As technology advances, the Miller capacitance has a more significant effect on power of the cell and ignoring such an effect results in inaccuracy in power calculation.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

FIG. 5 is a schematic circuit diagram of the stage with indicated current directions for characterizing the internal energy corresponding to a rising output transition in some embodiments.

FIG. 6A schematically illustrates a falling input voltage transition, an output voltage transition, and a current transition of a current through the supply rail of the stage for characterizing the internal energy in accordance with some embodiments.

FIG. 6B schematically illustrates the falling input voltage transition, the output voltage transition, and a current transition of a current through the ground of the stage in some embodiments.

Like reference symbols in the various drawings indicate like elements.

DETAIL DESCRIPTION

Figure 2A:
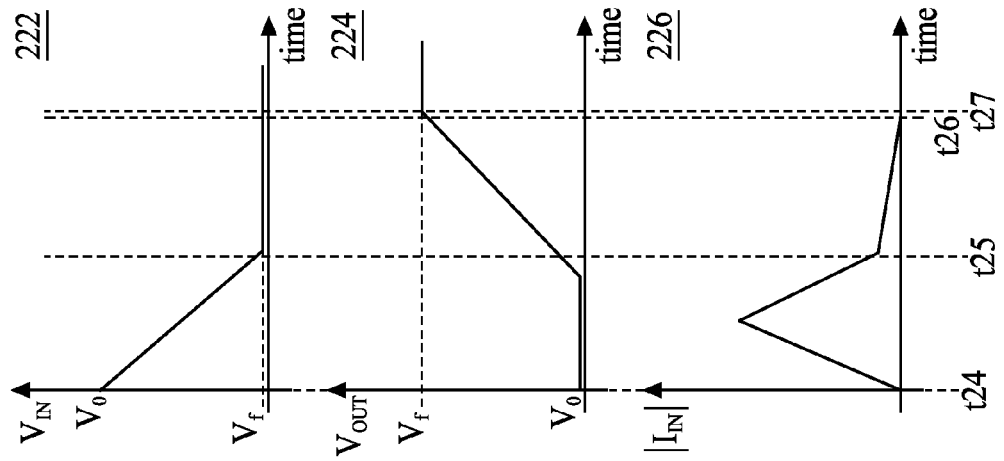
FIG. 2A schematically illustrates a rising input voltage transition, an output voltage transition, and an input current transition in some embodiments.

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numbers may be repeated throughout the embodiments, but this does not necessarily require that feature(s) of one embodiment apply to another embodiment, even if they share the same reference number.

Cell Characterization with Miller Capacitance

For cell-based power calculation, calculating total power of a system comprising a plurality of cells includes characterizing each cell for power calculation, and using the characteristics of each cell in the system to calculate the total power of the system. In some embodiments, a cell is a single-stage cell such as an inverter, or a multiple-stage cell such as a buffer with cascaded inverters. A stage in the single-stage cell or a multiple-stage cell includes transistors such as at least one PMOS and at least one NMOS having coupled drains, sources and/or source and drain. For the multiple-stage cell, cell characterization for power calculation is performed with respect to each stage in the cell. Then, the coupled output and input between stages is treated as an internal node. Therefore, cell characterization is described with respect to a single stage below.

In some embodiments, each stage is a digital circuit. Total power of a stage includes dynamic power and leakage power, as shown in equation (1) below.

$$P_{total} = P_{leakage} + P_{dynamic} \quad (1)$$

where $P_{total}$ is the total power of the stage, $P_{dynamic}$ is the dynamic power and $P_{leakage}$ is the leakage power. The dynamic power $P_{dynamic}$ is consumed when the stage is switching. When the stage is switching, at least one input of the stage receives an input transition, and as a result, an output of the stage experiences an output transition. A transition is a rising transition from a logic low level to a logic high level or a falling transition from a logic high level to a logic low level. The leakage power $P_{leakage}$ is characterized when the stage is at steady state. When the stage is at steady state, the output of the stage stays at the same logic level.

Figure 1:
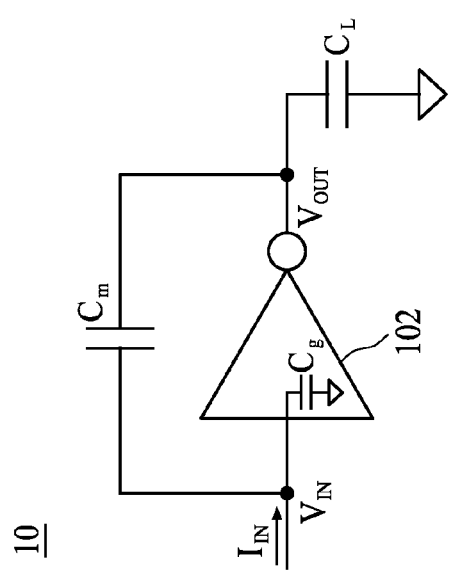
FIG. 1 is a schematic circuit diagram of a stage characterized for calculating the dynamic power in some embodiments.

FIG. 1 is a schematic circuit diagram of a stage 10 characterized for calculating the dynamic power in some embodiments. As an example, the stage 10 includes an inverter 102. The stage 10 is configured with an input and an output which are an input and an output of the inverter 102, respectively. At the input of the inverter 102, a parasitic capacitor $C_g$ of the inverter 102 couples the input to the ground. Also at the input of the inverter 102, a parasitic capacitor $C_m$ of the inverter 102 couples the output of the inverter 102 to the input of the inverter 102. At the output of the inverter 102, a loading capacitor $C_L$ couples the output to ground.

The dynamic power of the stage 10 is the sum of switching power and internal power of the stage 10, as expressed in equation (2) below:

$$P_{dynamic} = P_{switching} + P_{internal} \quad (2)$$

where $P_{switching}$ is the switching power and $P_{internal}$ is the internal power. The switching power $P_{switching}$ is caused by charging and subsequent discharging of the loading capacitor $C_L$ associated with the output of the stage 10. Because energy is supplied by the supply rail VDD during charging of the loading capacitor $C_L$ and the energy stored in the loading capacitor $C_L$ is dissipated to ground during discharging of the loading capacitor $C_L$, in some embodiments, the switching power $P_{switching}$ is considered to be consumed when the loading capacitor $C_L$ is being charged. In some embodiments, the switching power $P_{switching}$ follows a relationship shown in expression (3)

$$P_{switching} \propto C_L VDD^2 \quad (3)$$

where VDD is a voltage of a supply rail (not shown) of the stage 10. Typically, the output of a stage 10 is coupled to an input of each next stage. Therefore, the loading capacitor $C_L$ includes input capacitance seen at the input of the next stage. Similarly, characterizing a stage 10 for calculating switching power of a preceding stage to which the stage 10 is coupled to includes characterizing input capacitance seen at the input of the stage 10.

In some embodiments, the input capacitance of the stage 10 involves the parasitic capacitor $C_g$ coupling the input to the ground, and the parasitic capacitor $C_m$ coupling the output of the stage 10 to the input. For the parasitic capacitor $C_m$, because the output of the stage 10 exhibits gain with respect to the input of the stage 10, Miller effect increases capacitance of the parasitic capacitor $C_m$ seen at the input of the stage 10. Therefore, the input capacitance seen at the input of the stage 10 is given by equation (4).

$$C_{IN} = C_g + k \cdot C_m \quad (4)$$

where $C_{IN}$ denotes effective capacitance of a capacitor coupled between the input of the stage 10 and the ground; and k is a coefficient of the parasitic capacitor $C_m$ for reflecting the increase in capacitance of the parasitic capacitor $C_m$ due to Miller effect. In some embodiments, k ranges from 0 to 3.

The internal power $P_{internal}$ is power supplied by the supply rail VDD during switching of the stage 10 other than the switching power $P_{switching}$ and the leakage power $P_{leakage}$. Because power is energy dissipated per unit of time, internal energy is characterized. As switching energy is considered consumed when the loading capacitor $C_L$ is being charged, i.e. during a rising output transition, not when the loading capacitor $C_L$ is being discharged, i.e. during a falling output transition, the internal energy corresponding to the rising output transition and the falling output transition are given by equation (5) and (6), respectively.

$$E_{internal\_rising\ output} = E_{VDD} - E_{switching} - E_{leakage} \quad (5)$$

$$E_{internal\_falling\ output} = E_{VDD} - E_{leakage} \quad (6)$$

where $E_{internal\_rising\ output}$ is the internal energy corresponding to the rising output transition; $E_{internal\_falling\ output}$ is the internal energy corresponding to the falling output transition; $E_{VDD}$ is energy supplied by the supply rail VDD during switching of the stage 10; $E_{switching}$ is energy consumed for charging the loading capacitor $C_L$; and $E_{leakage}$ is energy consumption characterized when the stage 10 is in the steady state. In some embodiments, the stage 10 is implemented using CMOS logic, and the internal energy $E_{internal\_rising\ output}$ or $E_{internal\_falling\ output}$ includes energy consumed due to a short circuit current from the supply rail VDD to ground VSS during switching of the stage 10.

For calculating switching power $P_{switching}$ of a preceding stage, the input capacitance $C_{IN}$ of the stage 10 is characterized. In some embodiments, the input capacitance is calculated based on equation (7).

$$C_{IN} = \frac{\left| \int_{t0}^{ts} I_{IN}(t)\,dt \right|}{|V_{IN}(ts) - V_{IN}(t0)|} \quad (7)$$

wherein $I_{IN}$ is an input current at the input of the stage 10; $V_{IN}$ is an input voltage at the input of the stage 10; t0 and ts are a start time and a stop time for current integration, respectively. To account for the effect of the parasitic capacitance $C_m$ coupling the output of the stage 10 to the input of the stage 10, in some embodiments, the stop time ts is determined based on not only the input voltage $V_{IN}$, but also an output voltage $V_{OUT}$ at the output of the stage 10, as will be discussed with reference to FIGS. 2A and 2B below.

FIG. 2A schematically illustrates the input voltage $V_{IN}$ versus time of a rising input voltage transition 202; the output voltage $V_{OUT}$ versus time of an output voltage transition 204; and the absolute value of the input current $I_{IN}$ versus time of an input current transition 206 in some embodiments. In the input voltage transition 202, the input voltage $V_{IN}$ starts rising from an initial voltage $V_0$ at time t20, and reaches substantially 99% of an absolute difference of a steady state voltage $V_f$ with respect to the initial voltage $V_0$ at time t21. However, as shown in the input current transition 206, as the input voltage transition 202 reaches the steady state voltage $V_f$, which is close to time t21, the input current transition 206 has a tail portion which does not end until time t23. In some embodiments, a substantial tail portion exists between time t21 when the input voltage $V_{IN}$ reaches substantially 99% of the absolute difference of the steady state voltage $V_f$ to the initial voltage $V_0$ in the input voltage transition 202 and time t23 when the output voltage $V_{OUT}$ reaches the steady state voltage $V_f$ in the output voltage transition 204. The tail portion is due to the effect of the parasitic capacitor $C_m$ coupling the output of the stage 10 to the input of the stage 10. Therefore, to take the tail portion into consideration for current integration, the output voltage transition 204 of the output voltage $V_{OUT}$ is considered for determining the stop time ts. In the output voltage transition 204, the output voltage $V_{OUT}$ begins falling from an initial voltage $V_0$, reaches substantially 99% of an absolute difference of the initial voltage $V_0$ with respect to the steady state voltage $V_f$ at time t22, and reaches the steady state voltage $V_f$ at time t23. In some embodiments, the start time t0 for current integration is determined to be time t20 when the input voltage $V_{IN}$ begins transitioning from the initial voltage $V_0$. The stop time ts for current integration is determined to occur during the time the input current transition 206 exhibits the substantial tail portion. In some embodiments, the stop time ts is determined to be time t22 when the output voltage $V_{OUT}$ reaches substantially 99% of the absolute difference of the steady state voltage $V_f$ with respect to the initial voltage $V_0$ in the output voltage transition 204.

In the example illustrated in FIG. 2A, the input voltage transition 202 reaches the corresponding steady state voltage $V_f$ earlier than the output voltage transition 204 reaching the corresponding steady state voltage $V_f$. In another example, the input voltage transition reaches the corresponding steady state voltage $V_f$ later than the output voltage transition. Hence, in some embodiments, the substantial tail portion exists between the earlier of the input voltage transition 202 and output voltage transition 204 reaching substantially 99% of an absolute difference of a corresponding steady state voltage $V_f$ with respect to the initial voltage $V_0$, and the later of the input voltage transition 202 and the output voltage transition 204 reaching the corresponding steady state voltage $V_f$. The stop time ts occurs during the input current transition exhibits the substantial tail portion. In some embodiments, the stop time ts is determined based on equation (8).

$$ts = \max(ts_{input}, ts_{output}) \tag{8}$$

where $ts_{input}$ is the time for the input voltage $V_{IN}$ to reach substantially 99% of the absolute difference of the steady state voltage $V_f$ with respect to the corresponding initial voltage $V_0$; and $ts_{output}$ is the time for the output voltage $V_{OUT}$ to reach substantially 99% of the absolute difference of the corresponding steady state voltage $V_f$ with respect to the corresponding initial voltage $V_0$. In other embodiments, the stop time ts corresponds to a value of the input current $I_{IN}$ at which a substantial portion of the tail portion in the input current transition 206 is considered in the current integration. This is effectively the same as considering the later of the input voltage transition 202 and the output voltage transition 204 reaching the corresponding steady state voltage $V_f$. In some embodiments, the stop time ts occurs at the earlier of the input current $I_{IN}$ dropping to about 0.02% of a peak current in the input current transition 206 and the input current $I_{IN}$ dropping to about 2 times a leakage current of the stage 10. The condition with the leakage current is introduced to avoid the situation where 0.02% of the peak current is smaller than leakage current and cannot be reached.

Figure 2B:
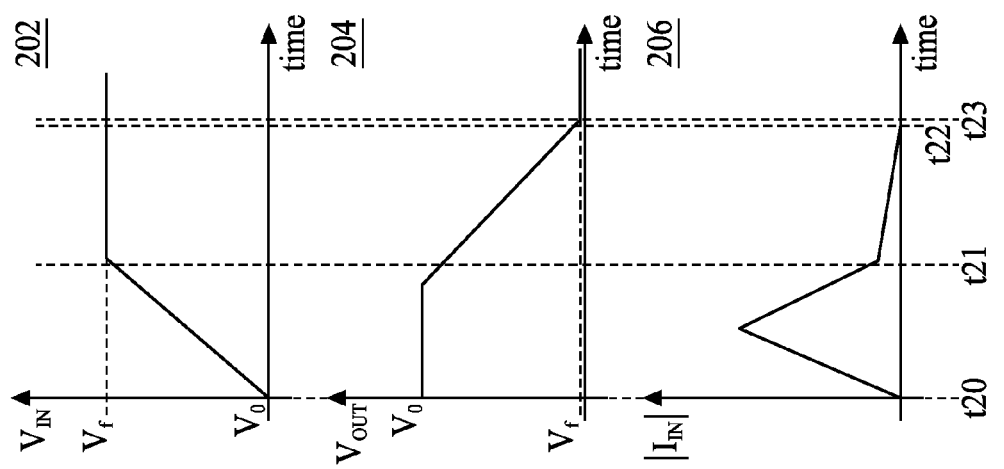
FIG. 2B schematically illustrates a falling input voltage transition, an output voltage transition, and an input current transition in some embodiments.

FIG. 2B schematically illustrates the input voltage $V_{IN}$ versus time of a falling input voltage transition 222; the output voltage $V_{OUT}$ versus time of an output voltage transition 224; and the absolute value of input current $I_{IN}$ versus time of an input current transition 226 in some embodiments. In the input voltage transition 222, the input voltage $V_{IN}$ starts falling from an initial voltage $V_0$ at time t24, and reaches substantially 99% of an absolute difference of a steady state voltage $V_f$ with respect to the initial voltage $V_0$ at time t25. In the output voltage transition 224, the output voltage $V_{OUT}$ begins rising from an initial voltage $V_0$, reaches substantially 99% of an absolute difference of a steady state voltage $V_f$ with respect to the initial voltage $V_0$ at time t26, and reaches the steady state voltage $V_f$ at time t27. In some embodiments, the input current transition 226 also exhibits a substantial tail portion between time t25 when the earlier of the input voltage $V_{IN}$ and the output voltage $V_{OUT}$ reaches substantially 99% of the absolute difference of the corresponding steady state voltage $V_f$ to the corresponding initial voltage $V_0$ in the input voltage transition 202 and time t27 when the later of the input voltage $V_{IN}$ and the output voltage $V_{OUT}$ reaches the corresponding steady state voltage $V_f$. Therefore, in some embodiments, the start time t0 is determined to be time t24 when the input voltage $V_{IN}$ is at the initial voltage $V_0$. The stop time ts for current integration is determined to occur during the time when the input current transition 226 exhibits the substantial tail portion. In some embodiments, the stop time ts is determined to be time t26 when the later of the input voltage $V_{IN}$ and the output voltage $V_{OUT}$ reaches substantially 99% of the absolute difference of the corresponding steady state voltage $V_f$ with respect to the corresponding initial voltage $V_0$. In some embodiments, because the input capacitance $C_{IN}$ being charged as calculated using FIG. 2A and the input capacitance $C_{IN}$ being discharged as calculated using FIG. 2B are the same, only one type of the transitions in FIGS. 2A and 2B are considered. However, in some embodiments which will be described with reference to FIGS. 11 and 12, the input capacitance $C_{IN}$ for rising input voltage transition 202 as shown in FIG. 2A and for falling input voltage transition 222 as shown in FIG. 2B are considered different to eliminating double counting of the effect of the parasitic capacitor $C_m$ in one type of the transitions.

Figure 3:
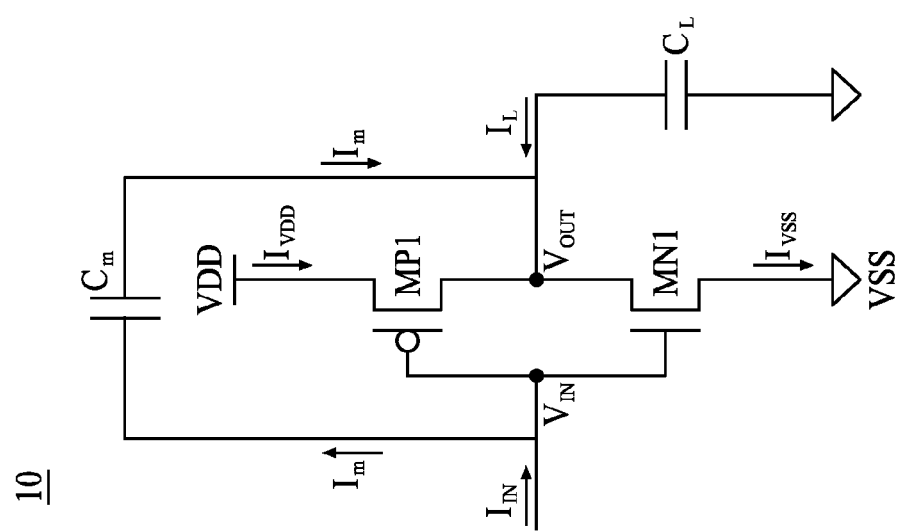
FIG. 3 is a schematic circuit diagram of the stage with indicated current directions for characterizing the internal energy corresponding to a falling output transition in some embodiments.

For calculating the internal power $P_{internal}$ of the stage 10, the internal energy of the stage 10 is characterized. FIG. 3 is a schematic circuit diagram of the stage 10 with indicated current directions for characterizing the internal energy $E_{internal\_falling\ output}$ corresponding to a falling output transition of the stage 10 in some embodiments. The inverter 102 in FIG. 1 is shown at transistor-level in FIG. 3. The inverter 102 includes a PMOS MP1 and an NMOS MN1. A source of the PMOS MP1 is coupled to the supply rail VDD, a drain of the PMOS is coupled to a drain of the NMOS MN1 and the source of the NMOS is coupled to the ground VSS. Coupled gates of the PMOS MP1 and the NMOS MN1 serve as the input of the stage 10, and the coupled drains of the PMOS MP1 and the NMOS MN1 serve as the output of the stage 10. The parasitic capacitor $C_g$ is not shown in FIG. 3, and the other configuration of the stage 10 is the same as that in FIG. 1 and is therefore omitted here.

In some embodiments, based on equation (6), to characterize the internal energy $E_{internal\_falling\ output}$, the energy supplied by the supply rail VDD is obtained. In some embodiments, the energy supplied by the supply rail VDD is calculated based on integrating a current $I_{VDD}$ flowing through the supply rail VDD, as shown in expression (9).

$$E_{VDD} \propto \int_{t0}^{ts} I_{VDD}(t) dt \quad (9)$$

where $I_{VDD}$ is the current flowing through the supply rail VDD; and t0 and ts are a start time and a stop time for integrating the current $I_{VDD}$, respectively. In some embodiments, the energy supplied by the supply rail VDD is calculated based on integrating a current $I_{VSS}$ flowing through the ground VSS, as shown in expression (10).

$$E_{VDD} \propto \int_{t0}^{ts} I_{VSS}(t) dt \quad (10)$$

where $I_{VSS}$ is the current flowing through the ground VSS; and t0 and ts are a start time and a stop time for integrating the current $I_{VSS}$, respectively.

Figure 4B:
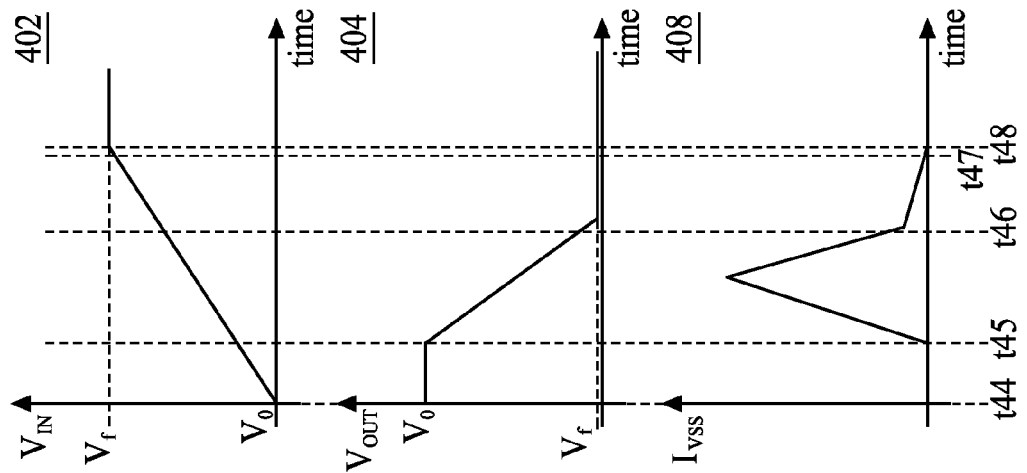
FIG. 4B schematically illustrates the rising input voltage transition, the output voltage transition, and a current transition of a current through the ground of the stage for characterizing internal energy in some embodiments.
Figure 4A:
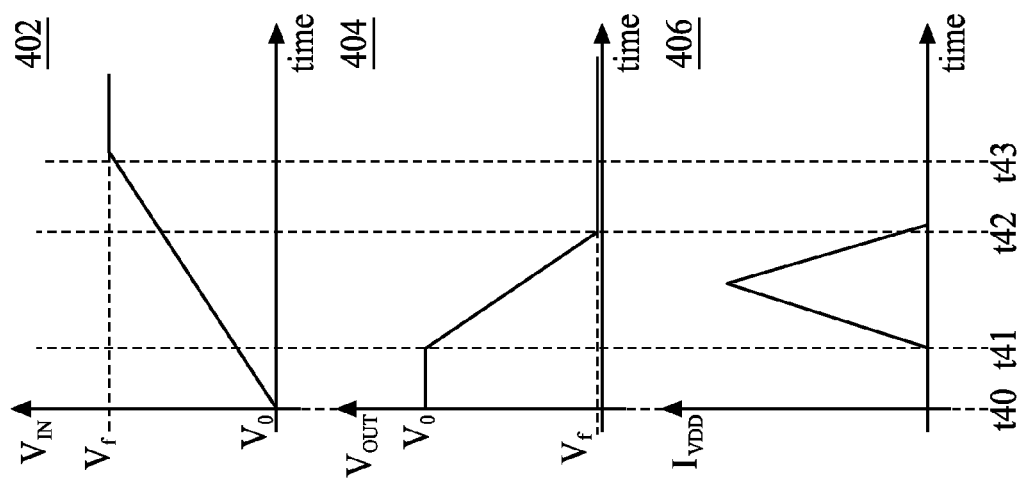
FIG. 4A schematically illustrates a rising input voltage transition, an output voltage transition, and a current transition of current through the supply rail of the stage for characterizing the internal energy in accordance with some embodiments.

FIG. 4A schematically illustrates the input voltage $V_{IN}$ versus time of a rising input voltage transition 402; the output voltage $V_{OUT}$ versus time of an output voltage transition 404; and the current $I_{VDD}$ versus time of an current transition 406 for characterizing the internal energy $E_{internal\_falling\ output}$ in some embodiments. In the input voltage transition 402, the input voltage $V_{IN}$ is experiencing a rising transition from an initial voltage $V_0$ to a steadying state voltage $V_f$. In the output voltage transition 404, the output voltage $V_{OUT}$ is experiencing a falling transition from an initial voltage $V_0$ to a steady state voltage $V_f$. Referring to FIG. 3, because the input voltage $V_{IN}$ is rising, an input current $I_{IN}$ flows into the input of the stage 10 to charge the input capacitance $C_{IN}$ of the stage 10 and branches out as a current $I_m$ along the parasitic capacitor $C_m$ to the output of the stage 10. Further, because the output voltage $V_{OUT}$ is falling, an output current $I_L$ flows into the output of the stage 10 to discharge the loading capacitor $C_L$. Also, the current $I_{VDD}$, the short circuit current for example, flows from the supply rail VDD through the PMOS MP1 and the NMOS MN1 to the ground VSS. The current $I_m$, the output current $I_L$ and the current $I_{VDD}$ are aggregated at a node at the output of the stage 10 as the current $I_{VSS}$ and flow to the ground VSS. Therefore, when the input voltage transition 402 is rising, the current $I_m$ is seen at the ground VSS but not at the supply rail VDD. As a result, the current transition 406 of the current $I_{VDD}$ does not have a tail portion contributed by the later of the input voltage $V_{IN}$ and the output voltage $V_{OUT}$ reaching the corresponding steady state voltage $V_f$. In some embodiments as will be described with reference to FIG. 8, the current transition 406 of the current $I_{VDD}$ is used for current integration for the rising input voltage $V_{IN}$ to avoid double counting the effect of the parasitic capacitor $C_m$ in the switching power $P_{switching}$ and the internal power $P_{internal}$. In some embodiments, the start time t0 for integrating the current $I_{VDD}$ is determined to be time t41 when the output voltage $V_{OUT}$ starts transitioning from the initial voltage $V_0$. The stop time ts for integrating the current $I_{VDD}$ is determined to be time t42 when the earlier of the input voltage $V_{IN}$ and the output voltage $V_{OUT}$ reaches substantially 99% of an absolute difference of the corresponding steady state voltage $V_f$ with respect to the corresponding initial voltage $V_0$. In other embodiments, the output voltage $V_{OUT}$ is not considered. The start time t0 is determined to be time t40 when the input voltage $V_{IN}$ starts transitioning from the initial voltage $V_0$. The stop time ts is determined to be time 43 when the input voltage $V_{IN}$ reaches substantially 99% of an absolute difference of the corresponding steady state voltage $V_f$ with respect to the corresponding initial voltage $V_0$.

FIG. 4B schematically illustrates the input voltage $V_{IN}$ versus time of the rising input voltage transition 402; the output voltage $V_{out}$ versus time of the output voltage transition 404; and the current $I_{VSS}$ versus time of a current transition 408 in some embodiments. The input voltage transition 402, and the output voltage transition 404 in FIG. 4B are the same as those in FIG. 4A. The difference between FIG. 4A and FIG. 4B is that the input current transition 406 is for the current $I_{VDD}$ flowing through the supply rail VDD and the input current transition 408 is for the current $I_{VSS}$ flowing through the ground VSS. Because when the input voltage transition 402 is rising, the current $I_m$ flowing through the parasitic capacitor $C_m$ is seen at the ground VSS, the current transition 408 of the current $I_{VSS}$ has a substantial tail portion contributed by the later of the input voltage $V_{IN}$ and the output voltage $V_{OUT}$ reaching a corresponding steady state voltage $V_f$. In some embodiments, the substantial tail portion of the input current transition 408 exists between time t46 when the earlier of the input voltage $V_{IN}$ and the output voltage $V_{OUT}$ reaching substantially 99% of an absolute difference of the corresponding steady state voltage $V_f$ with respect to the corresponding initial voltage $V_0$, and time t48 when the later of the input voltage $V_{IN}$ and the output voltage $V_{OUT}$ reaches the corresponding steady state voltage $V_f$. Therefore, in some embodiments, the start time t0 for integrating the current $I_{VSS}$ is determined to be time t44 or t45 when the input voltage $V_{IN}$ or output voltage $V_{OUT}$ starts transitioning from the corresponding initial voltage $V_0$. In some embodiments, the stop time ts for integrating the current $I_{VSS}$ is determined similarly to the stop time ts for integrating the input current $I_{IN}$ for characterizing the input capacitance $C_{IN}$ described with reference to FIG. 2A, and occurs during the input current transition 408 exhibits the substantial tail portion. In some embodiments, the stop time ts is determined to be time t47 when the later of the input voltage $V_{IN}$ and the output voltage $V_{OUT}$ reaching substantially 99% of the absolute difference of the corresponding steady state voltage $V_f$ with respect to the corresponding initial voltage $V_0$.

FIG. 5 is a schematic circuit diagram of the stage 10 in FIG. 1 with indicated current directions for characterizing the internal energy $E_{internal\_rising\ output}$ corresponding to a rising output transition of the stage 10 in some embodiments. FIG. 5 is the same as FIG. 3 except that the current directions indicated in FIG. 3 correspond to the falling output transition and those indicated in FIG. 5 correspond to the rising output transition.

In some embodiments, based on equation (5), to characterize the internal energy $E_{internal\_rising\ output}$, the energy supplied by the supply rail VDD is obtained based on integrating the current $I_{VDD}$ flowing through the supply rail VDD as shown in expression (9) or based on integrating the current $I_{VSS}$ flowing through the ground VSS as shown in expression (10).

FIG. 6A schematically illustrates the input voltage $V_{IN}$ versus time of a falling input voltage transition 622; the output voltage $V_{OUT}$ versus time of an output voltage transition 624; and the current $I_{VDD}$ versus time of a current transition 626 for characterizing the internal energy $E_{internal\_rising\ output}$ in some embodiments. In the input voltage transition 622, the input voltage $V_{IN}$ is experiencing a falling transition from an initial voltage $V_0$ to a steadying state voltage $V_f$. In the output voltage transition 624, the output voltage $V_{OUT}$ is experiencing a rising transition from an initial voltage $V_0$ to a steady state voltage $V_f$. Referring to FIG. 5, because the input voltage $V_{IN}$ is falling, a current $I_m$ flowing from the output of the stage 10 along the parasitic capacitor $C_m$ to the input of the stage 10 merges into an input current $I_{IN}$, and the input current $I_{IN}$ flows out from the input of the stage 10 to discharge the input capacitance $C_{IN}$ of the stage 10. Further, because the output voltage $V_{OUT}$ is rising, an output current $I_L$ flows out from the output of the stage 10 to charge the loading capacitor $C_L$.

Also, the current $I_{VSS}$, the short circuit current for example, flows from the supply rail VDD through the PMOS MP1 and the NMOS MN1 to the ground VSS. The current $I_{VDD}$ flows into a node at the output of the stage 10, and branches into the current $I_m$, the output current $I_L$ and the current $I_{VSS}$. Therefore, when the input voltage transition 622 is falling, the current $I_m$ flowing through the parasitic capacitor $C_m$ is seen at the supply rail VDD but not at the ground VSS. As a result, the current transition 626 of the current $I_{VDD}$ has a substantial tail portion contributed by the later of the input voltage $V_{IN}$ and the output voltage $V_{OUT}$ reaching the corresponding steady state voltage $V_f$. The manner with which the start time t0 and the stop time ts are determined for integrating the current $I_{VDD}$ for the falling input voltage transition 622 is similar to that for integrating the current $I_{VSS}$ for a rising input voltage transition 402 described with reference to FIG. 4B.

FIG. 6B schematically illustrates the input voltage $V_{IN}$ versus time of the falling input voltage transition 622; the output voltage $V_{OUT}$ versus time of the output voltage transition 624; and the current $I_{VSS}$ versus time of a current transition 628 in some embodiments. The input voltage transition 622, and the output voltage transitions 624 in FIG. 6B are the same as those in FIG. 6A. The difference between FIG. 6A and FIG. 6B is that the input current transition 626 is for the current $I_{VDD}$ flowing through the supply rail VDD and the input current transition 628 is for the current $I_{VSS}$ flowing through the ground VSS. Because when the input voltage transition 622 is falling, the current $I_m$ flowing through the parasitic capacitor $C_m$ is not seen at the ground VSS, the current transition 628 of the current $I_{VSS}$ does not have a tail portion. The manner with which the start time t0 and the stop time ts are determined for integrating the current $I_{VSS}$ for the falling input voltage transition 622 is similar to that for integrating the current $I_{VDD}$ for the rising input voltage transition 402 described with reference to FIG. 4A.

Figure 7:
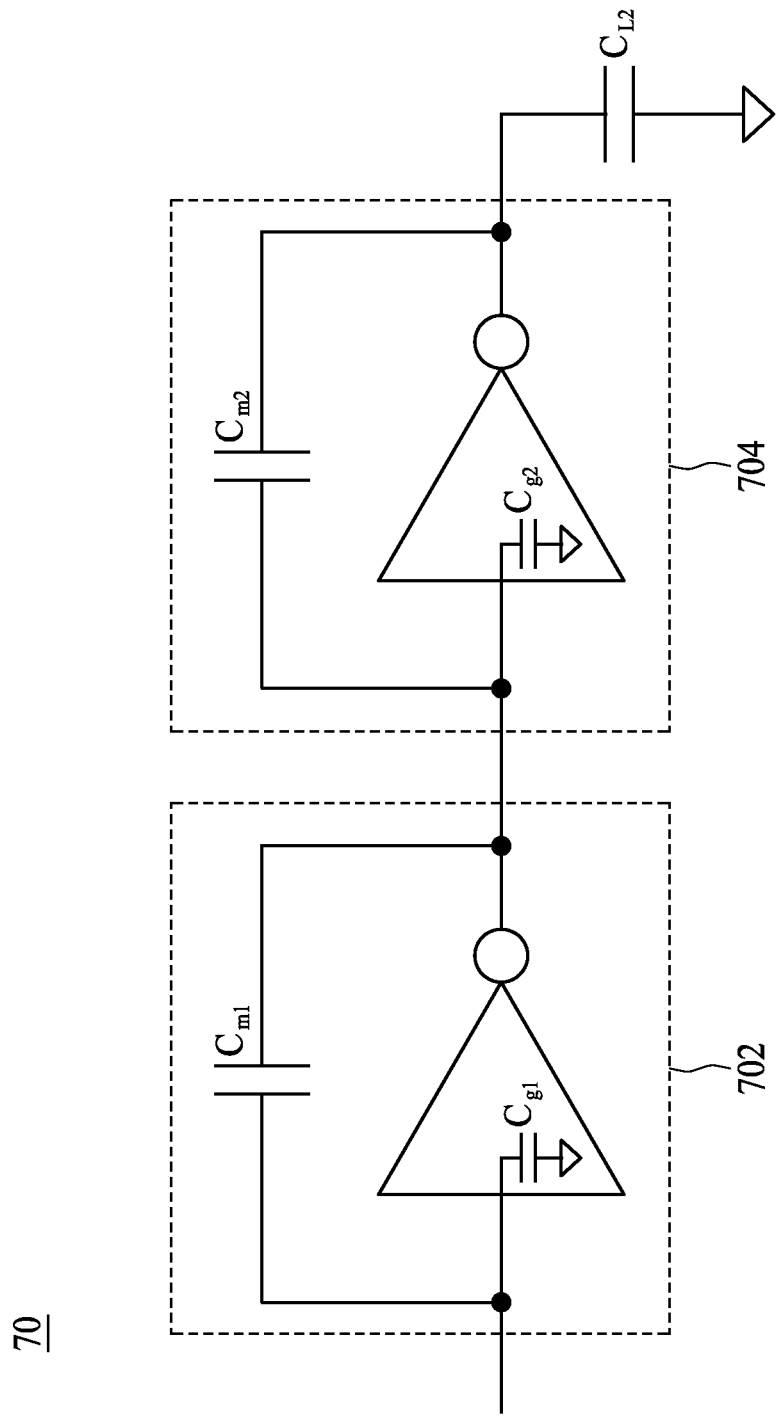
FIG. 7 is a schematic circuit diagram of cascaded stages for illustrating a scenario in which the effect of Miller capacitance is double counted in cell characterization for the input capacitance and the internal energy.

Method for Eliminating Double Counting Effect of Miller Capacitance in Cell Characterization FIG. 7 is a schematic circuit diagram 70 of cascaded stages 702 and 704 for illustrating a scenario in which the effect of Miller capacitance is double counted in cell characterization for the input capacitance and the internal energy. In FIG. 7, each stage 702 or 704 is similar to the stage 10 illustrated in FIG. 1. The stage 702 or 704 has a parasitic capacitor $C_{g1}$ or $C_{g2}$ similar to the parasitic capacitor $C_g$ of the stage 10, and has a parasitic capacitor $C_{m1}$ or $C_{m2}$ similar to the parasitic capacitor $C_m$ of the stage 10. The stage 702 has a loading capacitor which is the input capacitance $C_{IN2}$ of the stage 704, and is similar to the loading capacitor $C_L$ of the stage 10. The stage 704 has a loading capacitor $C_{L2}$ similar to the loading capacitor $C_L$ of the stage 10. For cell characterization, an input capacitance $C_{IN1}$ and internal energy $E_{internal1\_rising\ output}$ and internal energy $E_{internal1\_falling\ output}$ are determined for the stage 702, where $C_{IN1}$ involves the parasitic capacitors $C_{g1}$ and $C_{m1}$ as shown in equation (4). The input capacitance $C_{IN2}$ and internal energy $E_{internal2\_rising\ output}$ and internal energy $E_{internal2\_falling\ output}$ are determined for the stage 704, where $C_{IN2}$ involves the parasitic capacitors $C_{g2}$ and $C_{m2}$. As an example, suppose to obtain the internal energy $E_{internal1\_rising\ output}$, $E_{internal1\_falling\ output}$, $E_{internal2\_rising\ output}$ or $E_{internal2\_falling\ output}$, the current $I_{VDD}$ is used for integration. Dynamic energy of the stage 702 includes the switching energy calculated based on $C_{IN2}$, which accounts for the effect of the parasitic capacitor $C_{m2}$ for power calculation. Further, dynamic energy of the stage 704 includes the internal energy $E_{internal2\_rising\ output}$ and the internal energy $E_{internal2\_falling\ output}$, and the internal energy $E_{internal2\_rising\ output}$ also accounts for the effect of the parasitic capacitor $C_{m2}$ for power calculation. Therefore, the effect of the parasitic capacitor $C_{m2}$ is double counted.

Figure 8:
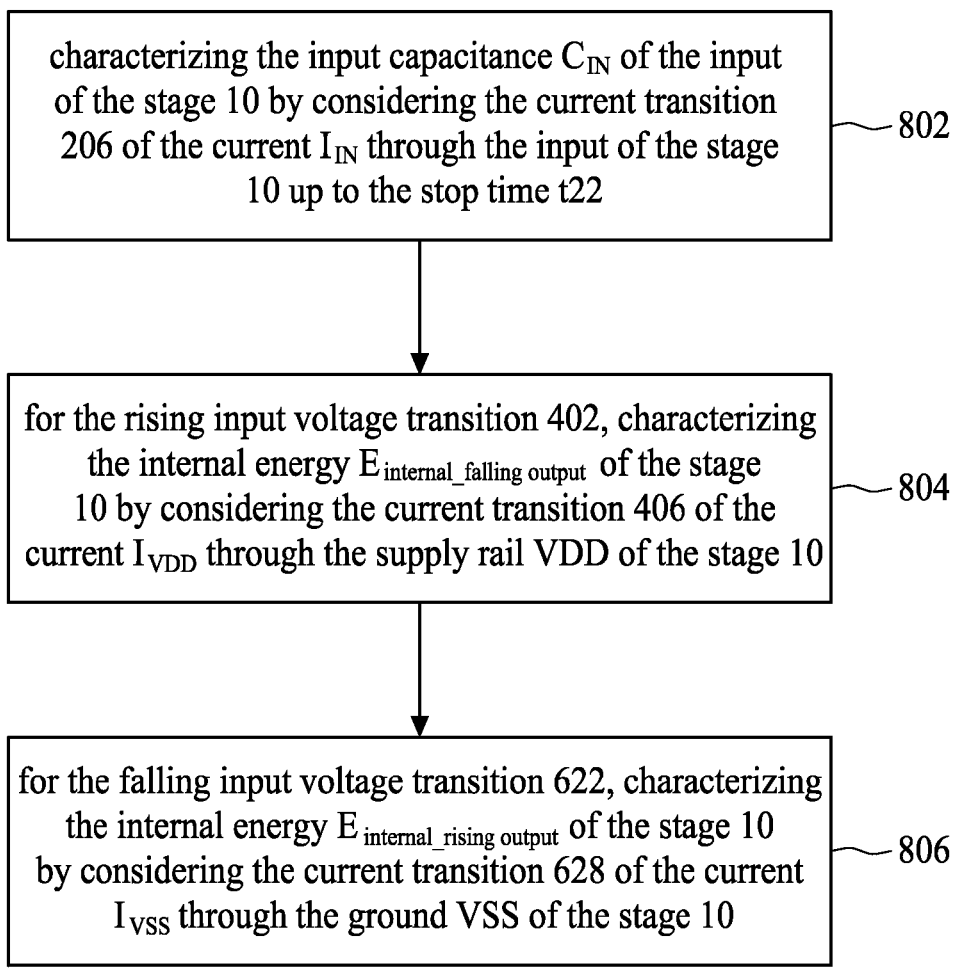
FIG. 8 is a flow chart of a method for eliminating double counting the effect of Miller capacitance in cell characterization in some embodiments.

FIG. 8 is a flow chart 800 of a method for eliminating double counting the effect of Miller capacitance in cell characterization in some embodiments. In FIG. 8, the effect of the parasitic capacitor $C_m$ coupling the output of the stage 10 to the input of the stage 10 is considered when characterizing the input capacitance $C_{IN}$, but is not considered when characterizing the internal energy $E_{internal\_output\ rising}$ and $E_{internal\_output\ falling}$ by alternating the current $I_{VSS}$ and the current $I_{VDD}$ being integrated. In operation 802, the input capacitance $C_{IN}$ of the stage 10 is characterized by considering the current transition 206 in FIG. 2A up to the stop time t22. The embodiment for characterizing the input capacitance $C_{IN}$ described with reference to FIG. 2A or 2B is applied to operation 802. In operation 804, for the rising input voltage transition 402 in FIG. 4A, the internal energy $E_{internal\_falling\ output}$ of the stage 10 is characterized by considering the current transition 406 of the current $I_{VDD}$ through the supply rail VDD of the stage 10. In operation 806, for the falling input voltage transition 622, the internal energy $E_{internal\_rising\ output}$ of the stage 10 is characterized by considering the current transition 628 of the current $I_{VSS}$ through the ground VSS of the stage 10. The embodiments for characterizing the internal energy $E_{internal\_falling\ output}$ and the internal energy $E_{internal\_rising\ output}$ described with reference to FIGS. 4A and 6B are applied to operations 804 and 806, respectively.

Figure 9:
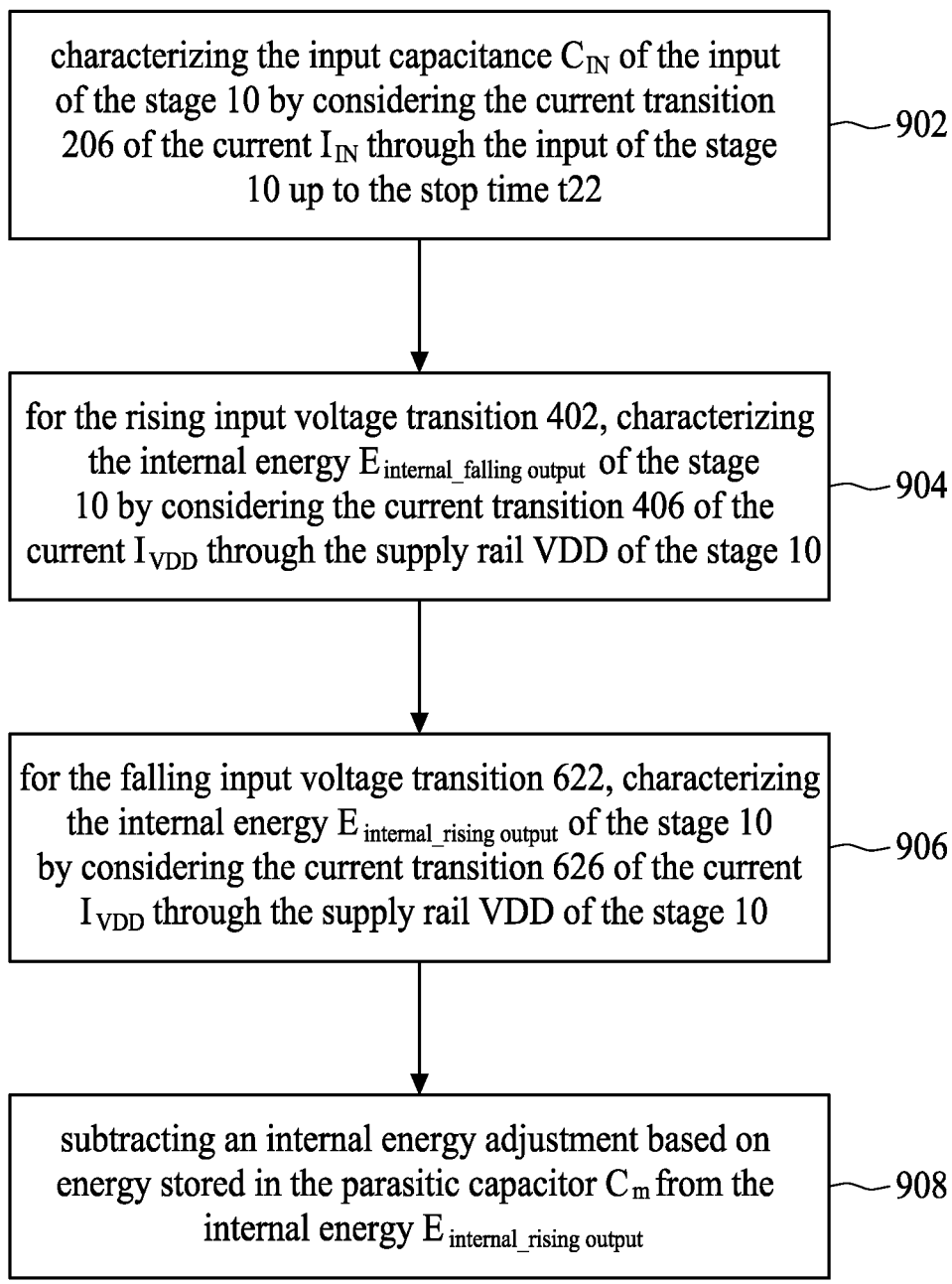
FIG. 9 is a flow chart of a method for eliminating double counting the effect of Miller capacitance in cell characterization in some embodiments.

FIG. 9 is a flow chart 900 of a method for eliminating double counting the effect of Miller capacitance in cell characterization in some embodiments. In FIG. 9, the effect of the parasitic capacitor $C_m$ coupling the output of the stage 10 to the input of the stage 10 is considered when characterizing the input capacitance $C_{IN}$, and is considered when characterizing the internal energy $E_{internal\_rising\ output}$ by integrating the current $I_{VDD}$, but is subtracted from the internal energy $E_{internal\_rising\ output}$. In operation 902, the input capacitance $C_{IN}$ of the stage 10 is characterized by considering the current transition 206 in FIG. 2A up to the stop time t22. The embodiment for characterizing the input capacitance $C_{IN}$ described with reference to FIG. 2A or 2B is applied to operation 902. In operation 904, for the rising input voltage transition 402 in FIG. 4A, the corresponding internal energy $E_{internal\_output\ falling}$ of the stage 10 is characterized by considering the current transition 406 at the supply rail VDD of the stage 10. In operation 906, for the falling input voltage transition 622 in FIG. 6A, the corresponding internal energy $E_{internal\_rising\ output}$ of the stage 10 is characterized by considering the current transition 626 of the current $I_{VDD}$ through the supply rail VDD of the stage 10. The embodiments for characterizing the internal energy $E_{internal\_falling\ output}$ and the internal energy $E_{internal\_rising\ output}$ described with reference to FIGS. 4A and 6A are applied to operations 904 and 906, respectively. In operation 908, an internal energy adjustment calculated based on energy stored in the parasitic capacitor $C_m$ is subtracted from the internal energy $E_{internal\_rising\ output}$. In some embodiments, the internal energy adjustment is equal to the energy stored in the parasitic capacitor $C_m$ multiplied by a coefficient ranging from 0 to 3.

Figure 10:
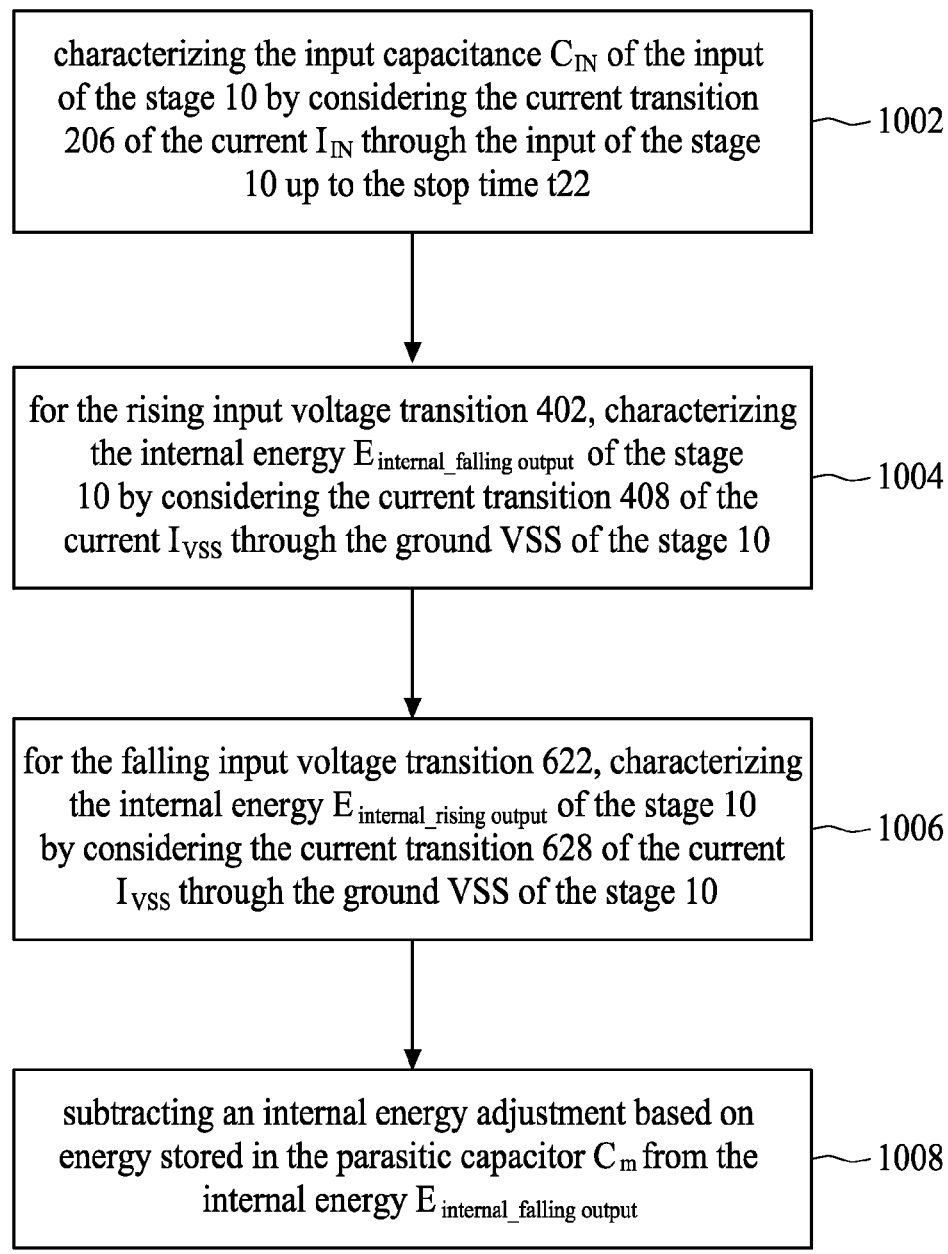
FIG. 10 is a flow chart of a method for eliminating double counting the effect of Miller capacitance in cell characterization in some embodiments.

FIG. 10 is a flow chart 1000 of a method for eliminating double counting the effect of Miller capacitance in cell characterization in some embodiments. In FIG. 10, the effect of the parasitic capacitor $C_m$ coupling the output of the stage 10 to the input of the stage 10 is considered when characterizing the input capacitance $C_{IN}$, and is considered when characterizing the internal energy $E_{internal\_falling\ output}$ by integrating the current $I_{VSS}$, but is subtracted from the internal energy $E_{internal\_falling\ output}$. In operation 1002, the input capacitance $C_{IN}$ of the stage 10 is characterized by considering the current transition 206 in FIG. 2A up to the stop time t22. The embodiment for characterizing the input capacitance $C_{IN}$ described with reference to FIG. 2A or 2B is applied to operation 1002. In operation 1004, for the rising input voltage transition 402 in FIG. 4A, the internal energy $E_{internal\_falling\ output}$ of the stage 10 is characterized by considering the current transition 408 of the current $I_{VSS}$ through the ground VSS of the stage 10. In operation 1006, for the falling input voltage transition 622 in FIG. 6B, the internal energy $E_{internal\_rising\ output}$ of the stage 10 is characterized by considering the current transition 628 at the ground VSS of the stage 10. The embodiments for characterizing the internal energy $E_{internal\_falling\ output}$ and the internal energy $E_{internal\_rising\ output}$ described with reference to FIGS. 4B and 6B are applied to operations 1004 and 1006, respectively. In operation 1008, an internal energy adjustment calculated based on energy stored in the parasitic capacitor $C_m$ is subtracted from the internal energy $E_{internal\_falling\ output}$. In some embodiments, the internal energy adjustment is equal to the energy stored in the parasitic capacitor $C_m$ multiplied by a coefficient ranging from 0 to 3.

Figure 11:
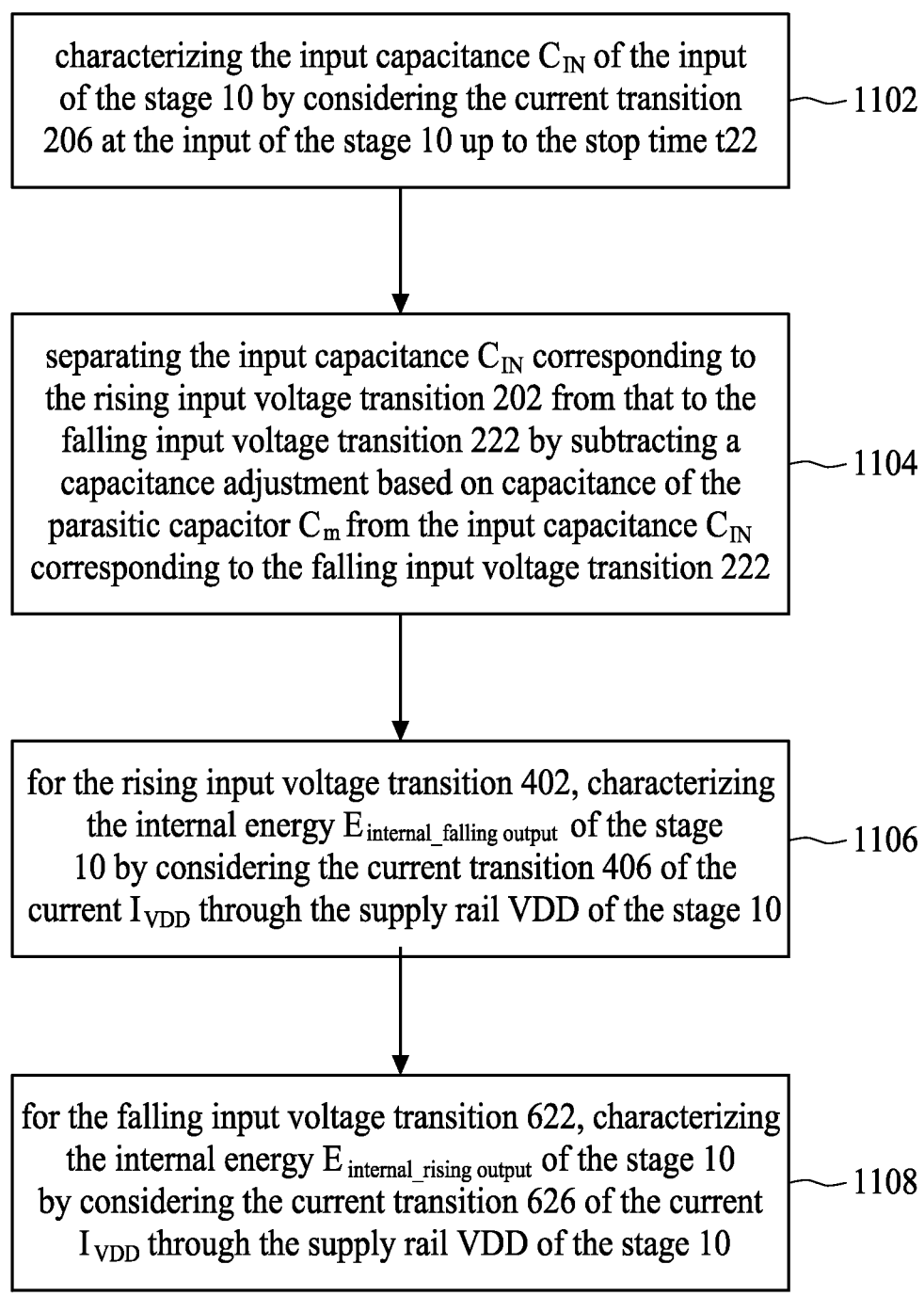
FIG. 11 is a flow chart of a method for eliminating double counting the effect of Miller capacitance in cell characterization in some embodiments.

FIG. 11 is a flow chart 1100 of a method for eliminating double counting the effect of Miller capacitance in cell characterization in some embodiments. In FIG. 11, the effect of the parasitic capacitor $C_m$ coupling the output of the stage 10 to the input of the stage 10 is considered when characterizing the input capacitance $C_{IN}$, and is considered when characterizing the internal energy $E_{internal\_rising\ output}$ by integrating the current $I_{VDD}$, but is subtracted from the input capacitance $C_{IN}$ corresponding to the falling input voltage transition which is separated from that corresponding to the rising input voltage transition. In operation 1102, the input capacitance $C_{IN}$ of the stage 10 is characterized by considering the current transition 206 in FIG. 2A up to the stop time t22. The embodiment for characterizing the input capacitance $C_{IN}$ described with reference to FIG. 2A or 2B is applied to operation 1102. In operation 1104, the input capacitance $C_{IN}$ corresponding to the rising input voltage transition 202 is separated from that to the falling input voltage transition 222 by subtracting a capacitance adjustment based on capacitance of the parasitic capacitor $C_m$ from the input capacitance $C_{IN}$ corresponding to the falling input voltage transition 222. In some embodiments, the capacitance adjustment is directly subtracted from the input capacitance $C_{IN}$ corresponding to the rising input voltage transition 202 to obtain the input capacitance $C_{IN}$ corresponding to the falling input voltage transition 222. In other embodiments, the capacitance adjustment is subtracted from the input capacitance $C_{IN}$ corresponding to the falling input voltage transition 222 characterized separately from the input capacitance $C_{IN}$ corresponding to the rising input voltage transition 202. In some embodiments, the capacitance adjustment is the capacitance of the parasitic capacitor $C_m$ multiplied by a coefficient ranging from 0 to 3. In operation 1106, for the rising input voltage transition 402 in FIG. 4A, the internal energy $E_{internal\_falling\ output}$ of the stage 10 is characterized by considering the current transition 406 of the current $I_{VDD}$ through the supply rail VDD of the stage 10. In operation 1108, for the falling input voltage transition 622 in FIG. 6A, the corresponding internal energy $E_{internal\_rising\ output}$ of the stage 10 is characterized by considering the current transition 626 of the current $I_{VDD}$ through the supply rail VDD of the stage 10. The embodiments for characterizing the internal energy $E_{internal\_falling\ output}$ and the internal energy $E_{internal\_rising\ output}$ described with reference to FIGS. 4A and 6A are applied to operations 1106 and 1108, respectively.

Figure 12:
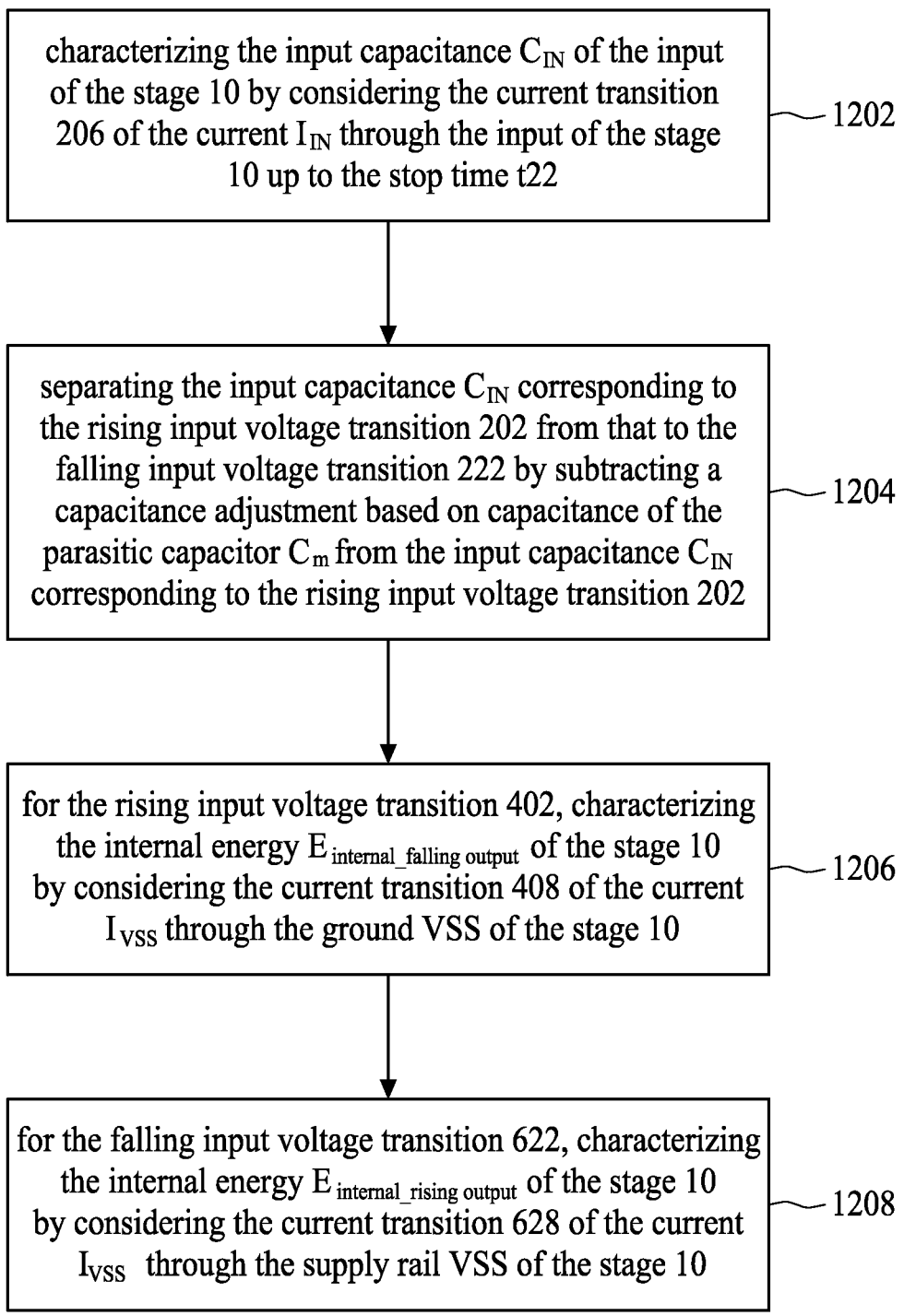
FIG. 12 is a flow chart of a method for eliminating double counting the effect of Miller capacitance in cell characterization in some embodiments.

FIG. 12 is a flow chart 1200 of a method for eliminating double counting the effect of Miller capacitance in cell characterization in some embodiments. In FIG. 12, the effect of the parasitic capacitor $C_m$ coupling the output of the stage 10 to the input of the stage 10 is considered when characterizing the input capacitance $C_{IN}$, and is considered when characterizing the internal energy $E_{internal\_falling\ output}$ by integrating the current $I_{VSS}$, but is subtracted from the input capacitance $C_{IN}$ corresponding to the rising input voltage transition which is separated from that corresponding to the falling input voltage transition. In operation 1202, the input capacitance $C_{IN}$ of the stage 10 is characterized by considering the current transition 206 in FIG. 2A up to the stop time t22. The embodiment for characterizing the input capacitance $C_{IN}$ described with reference to FIG. 2A or 2B is applied to operation 1202. In operation 1204, the input capacitance $C_{IN}$ corresponding to the rising input voltage transition 202 is separated from that to the falling input voltage transition 222 by subtracting a capacitance adjustment based on capacitance of the parasitic capacitor $C_m$ from the input capacitance $C_{IN}$ corresponding to the rising input voltage transition 202. In some embodiments, the input capacitance $C_{IN}$ corresponding to the rising input voltage transition 202 is directly used as the input capacitance $C_{IN}$ corresponding to the falling input voltage transition 222. In other embodiments, the input capacitance $C_{IN}$ corresponding to the falling input voltage transition 222 is characterized separately from the input capacitance $C_{IN}$ corresponding to the rising input voltage transition 202. In some embodiments, the capacitance adjustment is the capacitance of the parasitic capacitor $C_m$ multiplied by a coefficient ranging from 0 to 3. In operation 1206, for the rising input voltage transition 402 in FIG. 4B, the internal energy $E_{internal\_falling\ output}$ of the stage 10 is characterized by considering the current transition 408 of the current $I_{VSS}$ through the ground VSS of the stage 10. In operation 1208, for the falling input voltage transition 622 in FIG. 6B, the corresponding internal energy $E_{internal\_rising\ output}$ of the stage 10 is characterized by considering the current transition 628 of the current $I_{VSS}$ through the ground VSS of the stage 10. The embodiments for characterizing the internal energy $E_{internal\_falling\ output}$ and the internal energy $E_{internal\_rising\ output}$ described with reference to FIGS. 4B and 6B are applied to operations 1206 and 1208, respectively.

The methods described with reference to FIGS. 1 to 12 are not only applicable to cells implemented using CMOS logic, but are also applicable to cells implemented using pseudo NMOS logic, pass transistor logic, dynamic logic, or other logic families for which current integration is used to characterize input capacitance and internal energy.

System Embodiments

Figure 13:
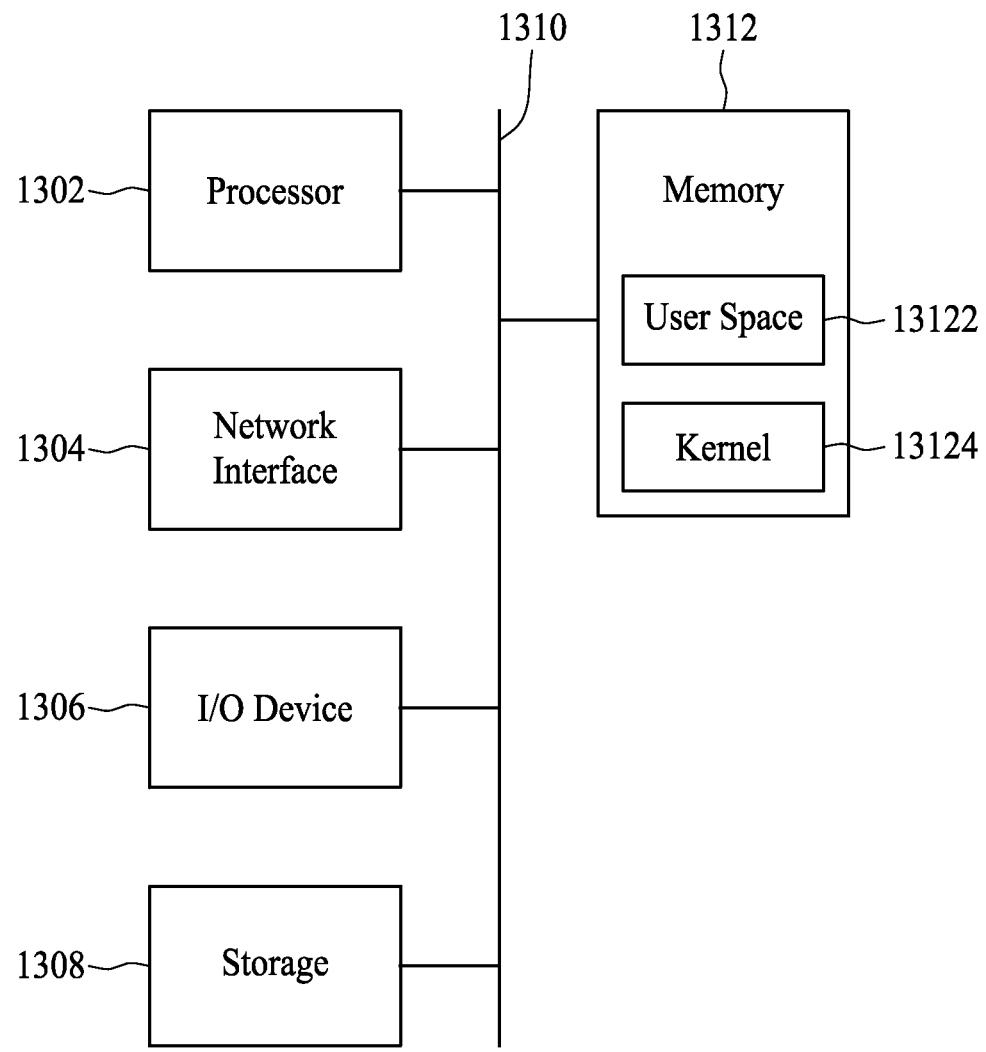
FIG. 13 is a block diagram of a system for performing methods described with reference to FIGS. 1-12 in some embodiments.

FIG. 13 is a block diagram of a system 1300 for performing methods described with reference to FIGS. 1-12 in accordance with some embodiments. The system 1300 includes at least one processor 1302, a network interface 1304, an input and output (I/O) device 1306, a storage 1308, a memory 1312, and a bus 1310. The bus 1310 couples the network interface 1304, the I/O device 1306, the storage 1308 and the memory 1312 to the processor 1302.

In some embodiments, the memory 1312 comprises a random access memory (RAM) and/or other volatile storage device and/or read only memory (ROM) and/or other nonvolatile storage device. The memory 1312 includes a kernel 13124 and user space 13122, configured to store program instructions to be executed by the processor 1302 and data accessed by the program instructions.

In some embodiments, the network interface 1304 is configured to access program instructions and data accessed by the program instructions stored remotely through a network. The I/O device 1306 includes an input device and an output device configured for enabling user interaction with the system 1300. The input device comprises, for example, a keyboard, a mouse, etc. The output device comprises, for example, a display, a printer, etc. The storage device 1308 is configured for storing program instructions and data accessed by the program instructions. The storage device 1308 comprises, for example, a magnetic disk and an optical disk.

In some embodiments, when executing the program instructions, the processor 130 is configured as a cell characterization tool which receives a design for which cell-based power calculation is performed, calculates power of each stage in the design by characterizing the stage using any of the methods described with reference to FIGS. 1 to 12. In some embodiments, the processor 130 is further configured as a system-level power calculation tool which calculates a system-level power of the design using the power of each stage.

In some embodiments, the program instructions are stored in a non-transitory computer readable recording medium such as one or more optical disks, hard disks and non-volatile memory devices.

Some embodiments have one or a combination of the following features and/or advantages. In some embodiments, for characterizing input capacitance and internal energy for cell-based power calculation, current integration is performed up to a stop time occurring between the earlier of an input voltage transition and an output voltage transition reaching substantially a corresponding steady state voltage and the later of an input voltage transition and an output voltage transition reaching substantially a corresponding steady state voltage. Therefore, the Miller capacitance is considered in current integration for characterizing the input capacitance and the internal energy. In some embodiments, double counting of the effect of Miller capacitance in system-level power calculation is eliminated by considering the Miller capacitance in characterizing the input capacitance but not in characterizing the internal energy, or by considering the Miller capacitance both in characterizing the input capacitance and the internal energy and subtracting an adjustment for Miller capacitance from one of the input capacitance and the internal energy. Hence, accuracy for power calculation is enhanced.

In some embodiments, in a method performed by at least one processor, input capacitance of an input of a first stage in a cell by considering a first current transition at the input of the first stage up to a first stop time is characterized using the at least one processor. The first stop time occurs during a substantial tail portion of the first current transition contributed by the later of a first input voltage transition and a first output voltage transition reaching a corresponding steady state voltage. The first input voltage transition is associated with the input of the first stage. The first output voltage transition is associated with an output of the first stage coupled to the input through a capacitor.

In some embodiments, in a method, for a rising first input voltage transition, corresponding internal energy of a first stage of a cell by considering a first current transition at a first supply rail of the first stage is characterized. For a falling second input voltage transition, corresponding internal energy of the first stage by considering a second current transition at a second supply rail of the first stage is characterized. The first supply rail has a higher voltage than the second supply rail.

A system includes at least one processor and at least one memory. The at least one processor is configured to execute program instructions comprising a cell characterization tool. The at least one memory is configured to store the program instructions. The cell characterization tool is configured to characterize input capacitance of an input of a first stage in a cell by considering a first current transition at the input of the first stage up to a first stop time. The first stop time occurs during the first current transition exhibits a substantial tail portion contributed by the later of a first input voltage transition and a first output voltage transition reaching a corresponding steady state voltage. The first input voltage transition is associated with the input of the first stage. The first output voltage transition is associated with an output of the first stage coupled to the input through a capacitor.

The above description includes exemplary operations, but these operations are not necessarily required to be performed in the order shown. Operations may be added, replaced, changed order, and/or eliminated as appropriate, in accordance with the spirit and scope of the disclosure. Accordingly, the scope of the disclosure should be determined with reference to the following claims, along with the full scope of equivalences to which such claims are entitled.

What is claimed is:

1. A method performed by at least one processor, comprising:
characterizing, using the at least one processor, input capacitance of an input of a first stage in a cell by considering a first current transition at the input of the first stage up to a first stop time,
wherein
the first stop time occurs during the first current transition exhibits a substantial tail portion contributed by the later of a first input voltage transition and a first output voltage transition reaching a corresponding steady state voltage;
the first input voltage transition is associated with the input of the first stage; and
the first output voltage transition is associated with an output of the first stage coupled to the input through a capacitor.

2. The method according to claim 1, further comprising:
for a rising second input voltage transition, characterizing corresponding internal energy of the first stage by considering a second current transition at a first supply rail of the first stage; and
for a falling third input voltage transition, characterizing corresponding internal energy of the first stage by considering a third current transition at a second supply rail of the first stage,
wherein
the first supply rail has a higher voltage than the second supply rail.

3. The method according to claim 1, further comprising:
for a rising second input voltage transition, characterizing corresponding internal energy of the first stage by considering a second current transition at a first supply rail of the first stage;
for a falling third input voltage transition, characterizing corresponding internal energy of the first stage by considering a third current transition at the first supply rail of the first stage up to a third stop time; and
subtracting an internal energy adjustment based on energy stored in the capacitor from the corresponding internal energy of the falling third input voltage transition,
wherein
the third stop time occurs during the third current transition exhibits a substantial tail portion contributed by the later of the third input voltage transition and a third output voltage transition reaching a corresponding steady state voltage;

the third input voltage transition is associated with the input of the first stage;

the third output voltage transition is associated with an output of the first stage coupled to the input through the capacitor; and the first supply rail has a higher voltage than a second supply rail.

4. The method according to claim 1, further comprising:

for a rising second input voltage transition, characterizing corresponding internal energy of the first stage by considering a second current transition at a second supply rail of the first stage up to a second stop time;

for a falling third input voltage transition, characterizing corresponding internal energy of the first stage by considering a third current transition at the second supply rail of the first stage; and subtracting an internal energy adjustment based on energy stored in the capacitor from the corresponding internal energy of the rising second input voltage transition, wherein the second stop time occurs during the second current transition exhibits a substantial tail portion contributed by the later of the second input voltage transition and a second output voltage transition reaching a corresponding steady state voltage;

the second input voltage transition is associated with the input of the first stage;

the second output voltage transition is associated with an output of the first stage coupled to the input through a capacitor; and the first supply rail has a higher voltage than the second supply rail.

5. The method according to claim 1, wherein for a rising second input voltage transition, characterizing corresponding internal energy of the first stage by considering a second current transition at a first supply rail of the first stage;

for a falling third input voltage transition, characterizing corresponding internal energy of the first stage by considering a third current transition at the first supply rail of the first stage up to a third stop time; and separating input capacitance corresponding to the rising first input voltage transition and the falling first input voltage transition by subtracting a capacitance adjustment based on a capacitance of the capacitor from the corresponding input capacitance of the falling first input voltage transition, wherein the third stop time occurs during the third current transition exhibits a substantial tail portion contributed by the later of the third input voltage transition and a third output voltage transition reaching a corresponding steady state voltage;

the third input voltage transition is associated with the input of the first stage;

the third output voltage transition is associated with an output of the first stage coupled to the input through the capacitor; and the first supply rail has a higher voltage than a second supply rail.

6. The method according to claim 1, further comprising:

for a rising second input voltage transition, characterizing corresponding internal energy of the first stage by considering a second current transition at a second supply rail of the first stage up to a second stop time;

for a falling third input voltage transition, characterizing corresponding internal energy of the first stage by considering a third current transition at the second supply rail of the first stage; and separating input capacitance corresponding to the rising first input voltage transition and the falling first input voltage transition by subtracting a capacitance adjustment based on a capacitance of the capacitor from the corresponding input capacitance of the rising first input voltage transition, wherein the second stop time occurs during the second current transition exhibits a substantial tail portion contributed by the later of the second input voltage transition and a second output voltage transition reaching a corresponding steady state voltage;

the second input voltage transition is associated with the input of the first stage;

the second output voltage transition is associated with an output of the first stage coupled to the input through the capacitor; and a first supply rail has a higher voltage than the second supply rail.

7. The method according to claim 1, wherein the first stop time occurs at the later of the first input voltage transition and the first output voltage transition reaching substantially 99% of the corresponding steady stage voltage with respect to a corresponding initial voltage.

8. The method according to claim 1, wherein the first stop time occurs at the earlier of a current in the first current transition reaching substantially 0.02% of a peak current in the first current transition, and substantially 2 times a leakage current of the first stage.

9. A method performed by at least one processor, comprising:

for a rising first input voltage transition, characterizing corresponding internal energy of a first stage of a cell by considering a first current transition at a first supply rail of the first stage; and for a falling second input voltage transition, characterizing corresponding internal energy of the first stage by considering a second current transition at a second supply rail of the first stage, wherein the first supply rail has a higher voltage than the second supply rail.

10. The method according to claim 9, further comprising:

characterizing input capacitance of an input of the first stage by considering a third current transition at the input of the first stage up to a first stop time, wherein the first stop time occurs during the third current transition exhibits a substantial tail portion contributed by the later of a third input voltage transition and a third output voltage transition reaching a corresponding steady state voltage;

the third input voltage transition is associated with the input of the first stage; and the third output voltage transition is associated with an output of the first stage coupled to the input through a capacitor.

11. The method according to claim 10, wherein the first stop time occurs at the later of the third input voltage transition and the third output voltage transition reaching substantially 99% of the corresponding steady stage voltage with respect to a corresponding initial voltage.

12. The method according to claim 10, wherein
the first stop time occurs at the earlier of a current in the third current transition reaching substantially 0.02% of a peak current in the third current transition, and substantially 2 times a leakage current of the first stage.

13. A system, comprising:
at least one processor configured to execute program instructions comprising:
  a cell characterization tool configured to characterize input capacitance of an input of a first stage in a cell by considering a first current transition at the input of the first stage up to a first stop time,
  wherein
    the first stop time occurs during the first current transition exhibits a substantial tail portion contributed by the later of a first input voltage transition and a first output voltage transition reaching a corresponding steady state voltage;
    the first input voltage transition is associated with the input of the first stage; and
    the first output voltage transition is associated with an output of the first stage coupled to the input through a capacitor; and
at least one memory configured to store the program instructions.

14. The system according to claim 13, wherein the cell characterization tool is further configured to:
for a rising second input voltage transition, characterizing corresponding internal energy of the first stage by considering a second current transition at a first supply rail of the first stage; and
for a falling third input voltage transition, characterizing corresponding internal energy of the first stage by considering a third current transition at a second supply rail of the first stage,
wherein
  the first supply rail has a higher voltage than the second supply rail.

15. The system according to claim 13, wherein the cell characterization tool is further configured to:
for a rising second input voltage transition, characterizing corresponding internal energy of the first stage by considering a second current transition at a first supply rail of the first stage;
for a falling third input voltage transition, characterizing corresponding internal energy of the first stage by considering a third current transition at the first supply rail of the first stage up to a third stop time; and
subtracting an internal energy adjustment based on energy stored in the capacitor from the corresponding internal energy of the falling third input voltage transition,
wherein
  the third stop time occurs during the third current transition exhibits a substantial tail portion contributed by the later of the third input voltage transition and a third output voltage transition reaching a corresponding steady state voltage;
  the third input voltage transition is associated with the input of the first stage;
  the third output voltage transition is associated with an output of the first stage coupled to the input through the capacitor; and
  the first supply rail has a higher voltage than a second supply rail.

16. The system according to claim 13, wherein the cell characterization tool is further configured to:
for a rising second input voltage transition, characterizing corresponding internal energy of the first stage by considering a second current transition at a second supply rail of the first stage up to a second stop time;
for a falling third input voltage transition, characterizing corresponding internal energy of the first stage by considering a third current transition at the second supply rail of the first stage; and
subtracting an internal energy adjustment based on energy stored in the capacitor from the corresponding internal energy of the rising second input voltage transition,
wherein
  the second stop time occurs during the second current transition exhibits a substantial tail portion contributed by the later of the second input voltage transition and a second output voltage transition reaching a corresponding steady state voltage;
  the second input voltage transition is associated with the input of the first stage;
  the second output voltage transition is associated with an output of the first stage coupled to the input through a capacitor; and
  the first supply rail has a higher voltage than the second supply rail.

17. The system according to claim 13, wherein the cell characterization tool is further configured to:
for a rising second input voltage transition, characterizing corresponding internal energy of the first stage by considering a second current transition at a first supply rail of the first stage;
for a falling third input voltage transition, characterizing corresponding internal energy of the first stage by considering a third current transition at the first supply rail of the first stage up to a third stop time; and
separating input capacitance corresponding to the rising first input voltage transition and the falling first input voltage transition by subtracting a capacitance adjustment based on a capacitance of the capacitor from the corresponding input capacitance of the falling first input voltage transition,
wherein
  the third stop time occurs during the third current transition exhibits a substantial tail portion contributed by the later of the third input voltage transition and a third output voltage transition reaching a corresponding steady state voltage;
  the third input voltage transition is associated with the input of the first stage;
  the third output voltage transition is associated with an output of the first stage coupled to the input through the capacitor; and
  the first supply rail has a higher voltage than a second supply rail.

18. The system according to claim 13, wherein the cell characterization tool is further configured to:
for a rising second input voltage transition, characterizing corresponding internal energy of the first stage by considering a second current transition at a second supply rail of the first stage up to a second stop time;
for a falling third input voltage transition, characterizing corresponding internal energy of the first stage by considering a third current transition at the second supply rail of the first stage; and
separating input capacitance corresponding to the rising first input voltage transition and the falling first input voltage transition by subtracting a capacitance adjustment based on a capacitance of the capacitor from the corresponding input capacitance of the rising first input voltage transition, wherein the second stop time occurs during the second current transition exhibits a substantial tail portion contributed by the later of the second input voltage transition and a second output voltage transition reaching a corresponding steady state voltage;

the second input voltage transition is associated with the input of the first stage;

the second output voltage transition is associated with an output of the first stage coupled to the input through the capacitor; and a first supply rail has a higher voltage than the second supply rail.

19. The system according to claim 13, wherein the first stop time occurs at the later of the first input voltage transition and the first output voltage transition reaching substantially 99% of the corresponding steady stage voltage with respect to a corresponding initial voltage.

20. The system according to claim 13, wherein the first stop time occurs at the earlier of a current in the first current transition reaching substantially 0.02% of a peak current in the first current transition, and substantially 2 times a leakage current of the first stage.

* * * * *